May 29, 1951  J. A. ALBAGNAC  2,554,548
COMPOSITE BRAKE LINING
Filed March 12, 1946
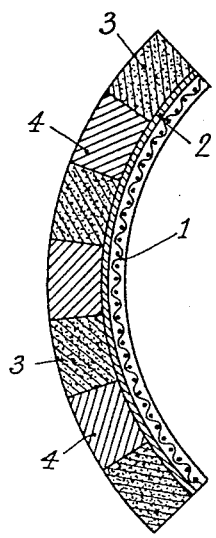

UNITED STATES PATENT OFFICE 2,554,548

COMPOSITE BRAKE LINING

Jean Augustin Albagnac, Paris, France, assignor to Societe: Le Carbone-Lorraine, a corporation of the French Republic Application March 12, 1946, Serial No. 653,750
In France March 9, 1945

Section 1, Public Law 690, August 8, 1946
Patent expires March 9, 1965

8 Claims. (Cl. 188—251)

The so called plastic frictional linings are generally constituted by fibres agglomerated by organic substances such as synthetic resins, asphaltum or rubber. The raise in temperature produced by friction may lead said organic substances to decompose and to produce solid, liquid and aeriform substances.

If the mass of these substances due to this decomposition is sufficiently large, they may form in practice between the two cooperating surfaces an intermediary layer which acts often as a lubricant. It is a well known fact that a plastic lining submitted during operation to a temperature rising during a few moments above 200° C. has a frictional coefficient which varies to a considerable extent.

In order to remove this drawback it has already been proposed to use linings made of ceramic ware including in particular carbon as prepared in accordance with the methods used for the preparation of artificial carbon. Linings of ceramic ware form as a matter of fact when raised to a high temperature, only slight amounts of aeriform or liquid substances. The application of such linings under the form of compact and rigid members is fully satisfactory in the case of the braking of the axles of railroad carriages.

In contradistinction, the brittleness and rigidity of carbon makes it more difficult to use in drum brakes as used on automobile vehicles. Furthermore, the frictional coefficient of carbon linings which are sufficient for railroad brakes is not sufficient for automobile brakes.

The object of the present invention is to remove such difficulties. It covers a compound brake lining wherein a strip having a reduced thickness and a sufficient flexibility and which may be constituted for instance by a metallic trellice serves as a support for dice-shaped graphite or carbon members separated from one another by fillings of a suitable plastic material. In this association, the carbon members and plastic members provide each their own advantages and form a system showing a sufficient flexibility together with a suitable frictional coefficient for the application considered.

Moreover, my invention shows the advantage that it is possible to select between any desired limits the respective percentages of the frictional surfaces of the carbon and of the plastic materia and to consequently adjust the frictional coefficient of the lining as a whole.

The appended drawing given solely by way of example illustrates diagrammatically a form of execution of the invention in longitudinal cross-section. A brake element as illustrated is constituted by a yielding and resistant backing or supporting strip I which may be made of metallic gauze or of an asbestos or glass web or of any other suitable material. To this strip is applied a thin adhesive and yielding layer 2 which provides for the securing of the dice-shaped members or blocks 3 of carbon which are thus glued thereto. The dice are embedded in a mass or between masses or blocks 4 of plastic material of any suitable type constituted for instance by a mixture of a fibrous material such as asbestos, glass wool, steel sponge, aluminium wool, mineral wool, and the like, with one or more synthetic resins and various oils. Before it is polymerized, this plastic mass shows a sufficient plasticity for ensuring after its compression a perfect, comparatively yielding, contact with the members or blocks 3. The same is heated then to the desired temperature and for the desired duration so as to make it set. The blocks are arranged in juxtaposition to one another and consist of alternating carbon blocks and blocks consisting of plastic.

In order to execute such braking elements, the strips I are caused to pass through a rolling machine while a layer of resin 2 in its pasty state is spread over their surface, the rolling action providing for a uniform thickness of said layer. The dice 3 and the intermediary masses 4 are then laid in suitable alternation and stuck to the layer 2 according to any known or approved of method, for instance by molding or compressing them between said layer 2 and a plurality of rollers, the spacing between which is adjusted as required. Oven drying is then used for achieving the polymerization of the masses formed.

According to a slightly modified form of execution, the carbon members or blocks 3 are cylindrical or prismatic and arranged in staggered relationship on the strip I by means of the adherent layer 2.

The brake element thus formed acts in the following manner in the braking: under the action of friction, each of the members or blocks 3 and masses 4 wears independently while releasing particles or waste of a different kind. The worn waste produced by the carbon dice is constituted by very fine carbon particles which are not abrasive and which, when crushed between two rubbing surfaces, fill first the recesses and cavities inside said surfaces and thereafter agglomerate so as to produce a film the frictional properties of which differ from those of the original surface. Generally speaking, this film forms at a comparatively low rate and is not very adherent. Consequently, the successive brakings ultimately remove same and its action cannot be felt except in the case of a very long braking operation.

The waste produced by the masses 4 is of a very compound character and includes a very small portion of slightly abrasive particles. During friction, the waste from the masses 4 carried along by the movement passes over the dice 3. It prevents the agglomeration of the carbon waste and thereby the formation of the intermediary film whereby the frictional coefficient of the carbon is still further improved and regularized.

Moreover, when the temperature reaches a high value, the masses 4 begin releasing a part of the substances formed through their decomposition. But on one hand the mass of liquid or aeriform material is much less considerable than in the case of a lining entirely constituted by plastic material. On the other hand, the carbon operating as active carbon incorporates part of said material. For both said reasons, the formation of a continuous intermediary film is considerably delayed.

The respective percentages of the surface of carbon or plastic material are defined so as to obtain in practice the highest regularity possible in the fractional coefficient, with respect to the general conditions of use for each particular application. The use of carbon dice having a suitable predetermined surface, which remains constant allows obtaining a more reliably regular coefficient of friction than if the linings were constituted as a heterogeneous mixture of plastic material and of carbon waste. The respective percentages of carbon surface and of plastic material surface allow also an adjustment of the value of the coefficent of friction. Moreover, this improved arrangement allows distributing at will, between certain limits, the location or the distribution of the carbon dice over the periphery of the brake element. In particular it is possible to provide in the masses of plastic material only the openings for the fixation rivets of the braking element on to the jaw holding same. This allows also adapting to a certain extent the grade of the lining to the nature of the stresses which it will have to resist during braking operations.

It is therefore of interest in most cases to locate one or more carbon dice at the point at which the highest pressure is exerted on the jaw. This reduces thus, on one hand, the greater speed of wear of this more considerably strained surface. On the other hand, by reason of the lower frictional coefficient of the carbon, the frictional torque is thus made more regular.

The above disclosed arrangements have been disclosed solely by way of examples and all the details of execution as well as the shapes, sizes and materials used may vary according to the case without departing from the spirit of the invention, as claimed in accompanying claims.

What I claim is:

1. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a plastic.

2. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a mixture of a plastic and a fibrous filler substance.

3. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a mixture of a polymerized synthetic resin and a fibrous filler substance.

4. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a plastic, said carbon blocks being firmly embedded between, and held in position by, said juxtaposed blocks consisting of a plastic.

5. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a mixture of a plastic and a fibrous non-metallic filler substance.

6. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a plastic, said carbon blocks having an active surface differing from that of said blocks consisting of a plastic.

7. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a plastic, said carbon blocks being devoid of cavities and perforations.

8. A composite brake lining, comprising in combination: a backing; a relatively thin layer of an elastic adhesive on one face of said backing; and blocks attached to said adhesive, said blocks being arranged in juxtaposition to one another and consisting of alternating carbon blocks and blocks consisting of a mixture of a polymerized synthetic resin and a fibrous non-metallic filler substance, said carbon blocks being firmly embedded between, and held in position by, said juxtaposed blocks consisting of a plastic.

JEAN ALBAGNAC.

REFERENCES CITED

The following references are of record in the file of this patent:

UNITED STATES PATENTS

| Number | Name | Date |
|---|---|---|
| 804,104 | De Dion et al. | Nov. 7, 1905 |
| 1,682,319 | Bluhm | Aug. 28, 1928 |
| 1,919,967 | Thompson | July 25, 1933 |
| 1,963,511 | Tseng | June 19, 1934 |
| 2,355,419 | Bruce | Aug. 8, 1944 |

FOREIGN PATENTS

| Number | Country | Date |
|---|---|---|
| 373,613 | Germany | Apr. 13, 1923 |
| 562,407 | Germany | Oct. 25, 1932 |
| 278,913 | Great Britain | Oct. 20, 1927 |